Aug. 11, 1936.  W. G. WILSON  2,050,406
METHOD OF AND APPARATUS FOR MAKING LOCK NUTS
Filed Oct. 6, 1934  2 Sheets-Sheet 1

INVENTOR.
Wylie G. Wilson
BY Ramsey Kant
ATTORNEYS

Aug. 11, 1936.  W. G. WILSON  2,050,406
METHOD OF AND APPARATUS FOR MAKING LOCK NUTS
Filed Oct. 6, 1934  2 Sheets-Sheet 2

INVENTOR.
Wylie G. Wilson
BY
Ramsey & Kent
his ATTORNEYS

Patented Aug. 11, 1936

2,050,406

UNITED STATES PATENT OFFICE 2,050,406

METHOD OF AND APPARATUS FOR MAKING LOCK NUTS

Wylie G. Wilson, Elizabeth, N. J., assignor to Wilson Locknut Company, Jersey City, N. J., a corporation of Delaware Application October 6, 1934, Serial No. 747,138

9 Claims. (Cl. 10—86)

This invention relates to lock-nuts, particularly of the type in which, by deformation of a part of the nut thread the nut will take a grip on an appropriate bolt sufficient to substantially insure against other than deliberate removal; and also to means for and methods of making the same. Lock-nuts of this general character have been devised in which the deformation of the nut thread is such that the application of the nut to an appropriate bolt does not destroy or seriously injure the bolt thread; as a consequence the nut may be screwed on and off repeatedly with no serious injury to the bolt but with gradually weaking grip of nut on bolt. There are situations where such a lock-nut should be used only once, and it is important that the lock-nut be provided with a tell-tale, so that the mechanic may readily identify a new nut that has not been used, and just as readily know whether the nut has been once screwed home on the bolt against another nut or a flange or the like and afterwards removed from the bolt.

In the drawings of this application which is in part a continuation of my copending application Serial No. 648,370, filed December 22, 1932, for Lock-nuts, I have shown in Fig. 1 a view partly in section and partly in elevation, illustrating a bolt and cooperating parts, including a lock-nut equipped in accordance with my invention, screwed part way down above a holding nut 8 on a bolt inserted in an element 7.

Figures 1, 2:
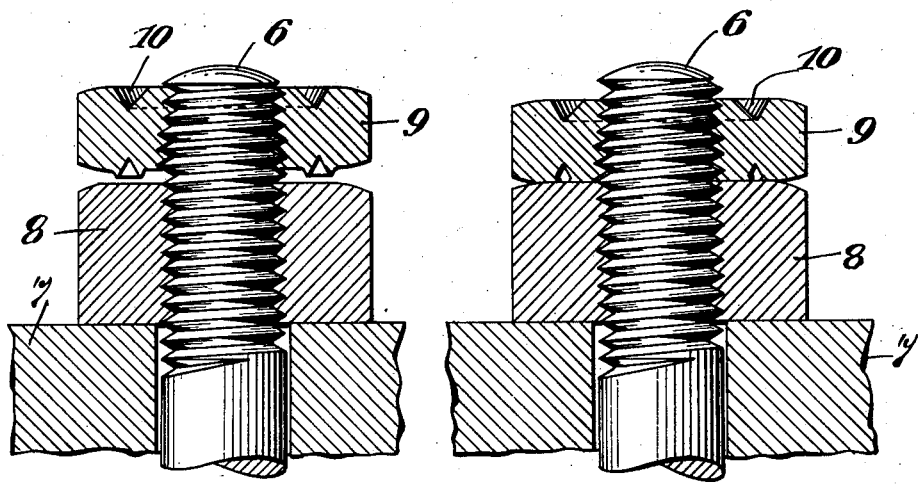
Fig. 2 is similar to Fig. 1, but shows the lock-nut screwed home, with consequent effect on the tell-tale.

By work face I mean the face which presses against the nut 8 or the flange or plate 7 to do the work for which the nut is used, i. e. holding parts together as when on flange 7, or holding another part in a specific place as when on nut 8.

Referring to the numerals on the drawings, the numeral 6 indicates a bolt, which may be associated with a plate or other element 7 as shown, and 8 is an ordinary nut screwed down on the bolt and engaging the surface of element 7 which may be a flange or the like. A lock-nut is shown at 9. This may be an ordinary nut, generally appropriate to the bolt, but having in an end face (the outer face in Fig. 1) an indentation 10 adjacent the nut aperture. The conformation and dimensions of this indentation and its distance from the nut aperture may be chosen so that as the indentation is pressed into the face of the nut adjacent the nut aperture, certain upper threads of the nut are deformed.

As a result of thread deformation produced by the indentation 10, we have a nut which will receive the bolt freely into the lower end of its threaded aperture, but whose threads will grip the bolt threads that are in the zone of the deformed threads, with the result that such a nut screwed on to a bolt as in Fig. 2 will resist reverse rotation, more or less strongly of course according to the kind and extent of thread deformation that has been accomplished in the nut.

On the lower or work face of the lock-nut 9 (the face which in the drawing is to make contact with the underlying ordinary nut 8 or other structure, obviously the lower nut 8 may be dispensed with and lock-nut 9 may contact directly with element 7) I provide tell-tale means, so that when lock-nut 9 is screwed on to the limit of its movement (as in Fig. 2) the characteristics of the tell-tale will be definitely and unmistakably changed.

Figures 3, 4:
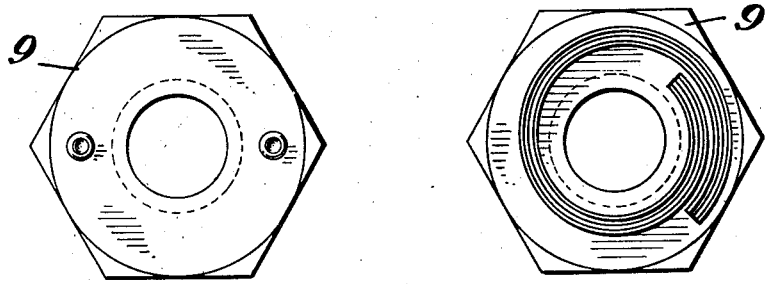
Figs. 3, 4 and 5 are plan views of the work face of a lock-nut such as shown in Figs. 1 and 2, having, respectively, different forms of tell-tale thereon.

In Fig. 3 (also Fig. 1) the tell-tale is a relatively thin and easily deformable outwardly projecting circular burr, surrounding a shallow pit; such pit and burr may be produced by driving into the nut face a centre punch or like tool, as will be readily understood. I prefer to use two of these tell-tales which may be diametrically opposed, as in Figs. 1, 2 and 3. Fig. 1 shows the tell-tale as it is before the lock-nut is screwed down tightly against the relatively stationary underlying element 8, and Fig. 2 shows it screwed down against element 8. In arriving at the close contact shown in Fig. 2 between the work face of the lock-nut and the opposed face of element 8, the burrs of the tell-tale or tell-tales have been flattened or bent or changed in form, so that they no longer project as before beyond the work face of the lock-nut. Therefore, if the lock-nut once so used, is taken off its bolt and thus made available for re-use, the fact of its previous use will be apparent to the mechanic who applies the test of vision or touch.

In Fig. 4 the readily deformable tell-tale is produced by a cast-up burr in spiral form. And in Fig. 5 we have a number of parallel indentations, with corresponding deformable line burrs cast up.

It will be noted that in the forms of tell-tale shown in the drawings the structure consists of a projection on the edge of a depression. The result of this is that in nuts made of such customary and more or less ductile materials as steel, brass, or the like, the projecting tell-tales may bend or flow or be displaced into the depression when pressed between the nut and an opposed face, thus permitting contact over the general area of the end face by the readily produced depression of the projection to the general plane of that face.

Preferably the indentation of the outer end face of the nut, that is, the operation which converts an ordinary nut into a lock, is done simultaneously with the operation that produces the tell-tale in the other or work face of the nut. And of course the indentations that produce the tell-tale burrs must not be so considerable as to cause thread deformation.

Figure 6:
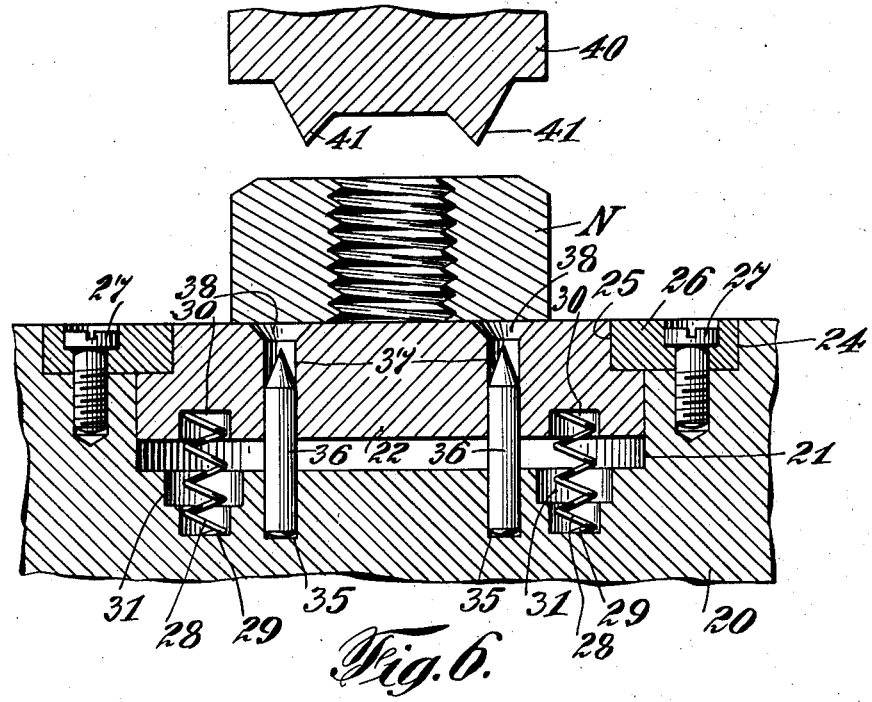
Fig. 6 is a vertical section of a portion of apparatus for operating on nuts.
Figure 7:
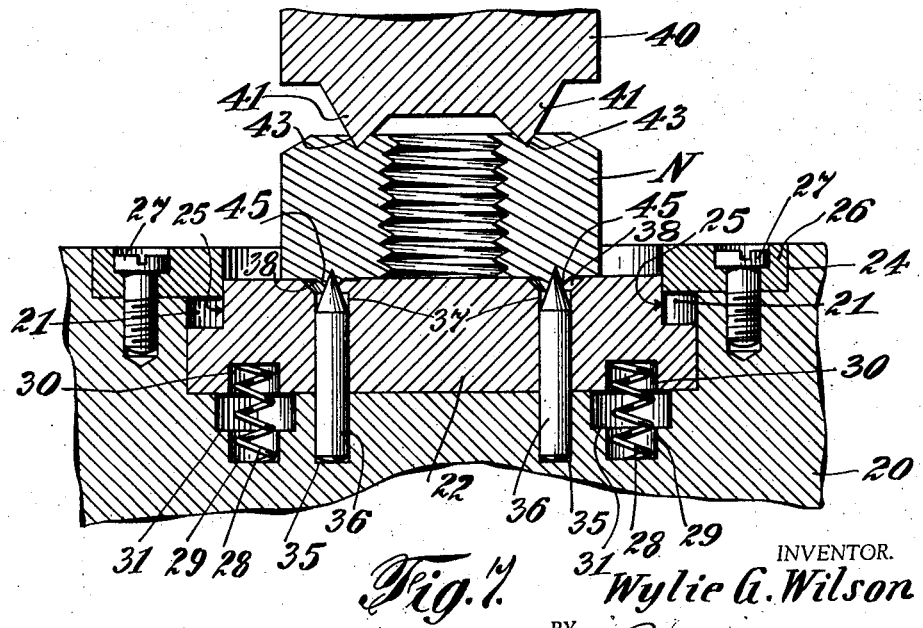
Fig. 7 is a similar view of the same apparatus in another position thereof.

Portions of apparatus for operating on nuts as set forth hereinbefore and particularly for applying tell-tale burrs of the character shown in Figs. 1 to 3 inclusive, are illustrated in Figs. 6 and 7. In these figures 20 indicates an anvil having a hollowed out portion 21 in which is mounted a movable block 22. The top of the anvil 20 has a second recess 24 while the top of the block 22 has a matched recess 25. A retaining ring 26 is held to the anvil 20 by screws 27, the ring fitting in the recesses 24 and 25 to retain the block 22 in the recess 21 and to limit upward movement of this block. The block is maintained normally in the position shown in Fig. 6 by means of springs 28 seated in openings 29 in the anvil and openings 30 in the block. It will be noted that the openings 29 have enlarged portions 31 near the top thereof, such portions being provided to assure that the spring when compressed will not be nipped between contacting surfaces.

The anvil 20 is provided with a number (preferably two) openings 35 into which are tightly fastened indenting tools 36. The block 22 is provided with openings 37 in alignment with the openings 35, that is, openings 37 are provided for the passage therethrough of the tools 36. The upper end of the openings 37 are countersunk as shown at 38.

The springs 28 as before mentioned serve to hold the block 22 in its uppermost normal position in which the face of the block is flush with the rest of the anvil. While the device has been shown as employing more than one spring it will be evident that any suitable number of springs could be used, or if desired a single central spring will suffice. This is true since the indenting tools 36 sliding in the openings 37 serve as guide means for assuring rectilinear movement of the block relative to the anvil. The tool for deforming a nut N into a lock nut is shown at 40 having indenting edges 41 which may be of any desired configuration and which may be in the nature of separated members or in the nature of a single unitary annular member. The apparatus for applying pressure to the tool 40 may be of any suitable character, for example, the apparatus may be similar to that disclosed and claimed in my copending application Serial No. 655,750 filed February 8, 1933 for Method and apparatus for compressing and indenting. Suffice it to say that when the tool 40 moves downwardly the piercing portions 41 thereof contact with the top surface of the nut N, and due to proper spring strength further downward movement of the tool forces the nut N and the block 22 downwardly against the resistance of the spring. Preferably the springs or spring are of such strength as to be able to hold the block in its normal position when the nut is placed thereon, but to permit the block to move downwardly as soon as any appreciable pressure is applied to the nut. Thus continued downward movement of the tool moves the nut N into the position shown in Fig. 7, as a result of which deformations 43 are formed in the upper surface of the nut and tell-tale burrs 45 are formed in the lower surface of the nut, these burrs being permitted to expand into the space provided by the countersunk portions 38 of the openings 37.

Figure 5:
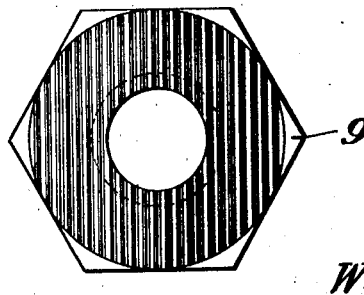

While the apparatus has been shown as being constructed in such fashion that the anvil has a moving part therein, such construction is necessary and advisable only where a sharp pointed tool is desired to penetrate the nut to produce tell-tale burrs. If the burrs of the types shown in Figs. 4 and 5 are to be utilized it will be evident that the anvil can be made solid and the face thereof carved to provide suitable grooves or indentations, which when a nut is placed thereupon and pressure applied by the moving tool 40, will serve to form the desired burrs in the lower surface of the nut. In other words, an anvil similar to that shown in my copending application Serial No. 655,750, before mentioned, may be used.

I claim:

1. The process of treating an ordinary nut which consists in pressing one end face of said nut to produce thread deformation therein and to so convert it into a lock-nut, and simultaneously indenting the other end face of the nut to produce a use tell-tale.

2. The process of treating an ordinary nut which consists in indenting one end face of said nut to produce thread deformation therein and to so convert it into a lock-nut, and simultaneously indenting the other end face of the nut to produce a use tell-tale.

3. Apparatus of the character described comprising an anvil for supporting a nut, a pressure operated tool for contact with the upper end face of the nut to deform the nut into a lock-nut, and means in said anvil for producing a tell-tale burr in the underface of said lock-nut when pressure is applied by said tool.

4. Apparatus of the character described comprising an anvil for supporting an ordinary nut, a pressure operated tool movable into contact with the upper end face of said nut, said tool being shaped to deform said nut under pressure into a lock-nut, the supporting face of said anvil being provided with means for producing a tell-tale burr in the other end face of said nut when pressure is applied by said tool to the upper end face of the nut.

5. Apparatus of the character described comprising an anvil provided with a recess in the upper surface thereof, a block movable vertically in said recess, means for limiting upward movement of said block to a position in which the upper surface thereof is substantially flush with the upper surface of the anvil, means tending to maintain the block at its limit of upward movement, indenting tools passing through said block, means for applying a deforming pressure to the upper end surface of a nut resting on said block and for simultaneously moving said block downwardly whereby said tools indent the under end surface of the nut.

6. Apparatus of the character described comprising an anvil having a recess in the upper surface thereof, a block positioned in said recess for rectilinear vertical movement therein, means for limiting the upward movement of said block, resilient means for normally forcing said block into its uppermost position, and indenting tools secured to said anvil and passing through said block, and means for applying pressure to the upper end face of a nut resting on said block to deform said nut into a lock-nut and to simultaneously force the lower end surface of the nut into contact with said tool whereby a burr is produced on said lower end surface of the nut by said tool.

7. A nut support vertically movable in opposite directions and having a through aperture, means for limiting the movement of the nut support in both directions, a pressure operated tool movable towards and away from the support, adapted on its down stroke to contact with a nut seated on said support and to move the nut and the support to the limit of downward movement of the support and thereafter with continued pressure to deform the nut into a lock-nut, means tending to move the support towards its limit of upward movement, and an indenting tool in the through aperture of the support, having an end protrusible above the support into contact with the lower end face of the nut when the support is moved towards its limit of downward movement, for producing a tell-tale burr on said lower end face of the nut, the indenting end of the burr-producing tool being below the nut-supporting surface when the movable support is at its limit of upward movement.

8. A nut support vertically movable in opposite directions and having a through aperture, means for limiting the movement of the nut support in both directions, a pressure operated tool movable towards and away from the support, adapted on its down stroke to contact with a nut seated on said support and to move the nut and the support to the limit of downward movement of the support and thereafter with continued pressure to deform the nut into a lock-nut, means tending to move the support towards its limit of upward movement, and an indenting tool in the through aperture of the support, stationary so far as bodily vertical movement is concerned, and having an end protrusible above the support into contact with the lower end face of the nut when the support is moved towards its limit of downward movement, for producing a tell-tale burr on said lower end face of the nut, the indenting end of the burr-producing tool being below the nut-supporting surface when the movable support is at its limit of upward movement.

9. Means for supporting a nut, a tool for producing a tell-tale mark on one end face of the nut, pressure means for engaging the other end face of the nut and moving it into contact with said tool with sufficient pressure so that the tool produces a tell-tale mark on one end face of the nut while the pressure means deforms the nut into a lock-nut.

WYLIE G. WILSON.